(12) United States Patent
Mumma et al.

(10) Patent No.: US 11,631,013 B2
(45) Date of Patent: Apr. 18, 2023

(54) ACTIONABLE ARTIFICIAL INTELLIGENCE ("AI") NOTIFICATION PLATFORM

(71) Applicant: Bank of America Corporation, Charlotte, NC (US)

(72) Inventors: Robert S. Mumma, Chicago, IL (US); Patrick Burgess, Chicago, IL (US); Trish Gillis, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 314 days.

(21) Appl. No.: 16/924,298

(22) Filed: Jul. 9, 2020

(65) Prior Publication Data

US 2022/0012604 A1    Jan. 13, 2022

(51) Int. Cl.
| | | |
|---|---|---|
| *G06Q 30/00* | (2023.01) | |
| *G06N 5/04* | (2023.01) | |
| *G06N 20/00* | (2019.01) | |
| *G06Q 20/42* | (2012.01) | |
| *G06Q 10/0631* | (2023.01) | |
| *G06Q 30/018* | (2023.01) | |
| *G06Q 20/32* | (2012.01) | |
| *G06Q 20/40* | (2012.01) | |
| *G06F 9/54* | (2006.01) | |
| *H04L 67/55* | (2022.01) | |
| *H04W 88/02* | (2009.01) | |

(52) U.S. Cl.
CPC ............... *G06N 5/04* (2013.01); *G06F 9/542* (2013.01); *G06N 20/00* (2019.01); *G06Q 10/06316* (2013.01); *G06Q 20/326* (2020.05); *G06Q 20/3221* (2013.01); *G06Q 20/40* (2013.01); *G06Q 20/425* (2013.01); *G06Q 30/0185* (2013.01); *H04L 67/55* (2022.05); *H04W 88/02* (2013.01)

(58) Field of Classification Search
None
See application file for complete search history.

(56) References Cited

U.S. PATENT DOCUMENTS

| | | | |
|---|---|---|---|
| 8,306,889 | B2 | 11/2012 | Leibon et al. |
| 8,538,827 | B1 | 9/2013 | Dryer et al. |
| 8,615,438 | B2 | 12/2013 | Hammad |
| 10,284,724 | B2 | 5/2019 | Hardy |
| 10,445,738 | B1 | 10/2019 | Waters et al. |

(Continued)

*Primary Examiner* — Matthew T Sittner
(74) *Attorney, Agent, or Firm* — Weiss & Arons LLP

(57) ABSTRACT

An actionable alert platform is provided. The platform may utilize artificial intelligence ("AI") to formulate alert triggers that inform a user regarding unusual activity associated with a target transaction. The platform allows a user to enter customized criteria for an alert trigger and actionable responses for remediating the detected alert trigger. In response to detecting an alert trigger, the platform may formulate and transmit push notifications to a mobile device of user. The user may implement the actionable response directly from within the push notification. The platform may also provide push notifications to the user that advise on a status of the target transaction after applying the actionable response. An AI engine may generate additional alert triggers based on the criteria entered by the user. The AI engine may generate the actionable responses for any alert trigger.

14 Claims, 8 Drawing Sheets

(56) References Cited

U.S. PATENT DOCUMENTS

| | | | |
|---|---|---|---|
| 2008/0262972 A1* | 10/2008 | Blake | G06Q 30/0603 |
| | | | 705/75 |
| 2015/0193775 A1 | 7/2015 | Douglas et al. | |
| 2017/0262879 A1 | 9/2017 | Elizondo Castillo et al. | |
| 2018/0115877 A1* | 4/2018 | Riker | H04L 51/066 |
| 2018/0332023 A1* | 11/2018 | Chari | H04L 63/20 |
| 2019/0236608 A1* | 8/2019 | Formsma | G06N 7/01 |
| 2019/0303940 A1 | 10/2019 | Miller et al. | |
| 2020/0286093 A1* | 9/2020 | Agrawal | G06Q 20/3821 |
| 2021/0182851 A1* | 6/2021 | Albisu | G06Q 20/3223 |
| 2021/0390445 A1* | 12/2021 | Cheng | G06F 3/167 |

* cited by examiner

| | Target Tx Type | Action Requested | Alert Triggered | Reason | Remedial Action |
|---|---|---|---|---|---|
| App User 2 | Payment | Approval | Yes | Excessive Number | Trace User Access |
| App User 3 | Access Attempt | Sign In | Yes | Excessive Number | Limit User Access |
| App User 4 | Payment | Approval Confirmation | Yes | Confirmatory | - |
| App User 5 | Payment | Approval | Yes | Linked to User 2 | Pause Tx |
| App User 6 | Payment | Approval | Yes | Linked to User 3 | Limit User Access |

| Vendor 2 | | |
|---|---|---|
| Tx Details | Alert Criteria | Remedial Action |
| Amount | Above $15,000 | Notification |
| Date | 3rd QTR 2020 | Notification |
| Approval Required | App User 5; App User 6 | Notification |
| Time | 9PM - 5AM EST | Notification; Pause Tx |
| Location | EUR, ASIA | Notification; Pause Tx |
| Authorized Users | App User 1; App User 2; App User 3; | Notification; Reject from any other Source |
| Authorized Device | Desktop Only | Notification; Pause Tx |
| Allow AI Engine Generation? | X | X |

ACTIONABLE ARTIFICIAL INTELLIGENCE ("AI") NOTIFICATION PLATFORM

FIELD OF TECHNOLOGY

Aspects of the disclosure relate to artificial intelligence and machine learning technology for improving computer-human communications.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows an illustrative information in accordance with principles of the disclosure;

FIG. 8 shows an illustrative generated information in accordance with principles of the disclosure.

DETAILED DESCRIPTION

Figure 1:
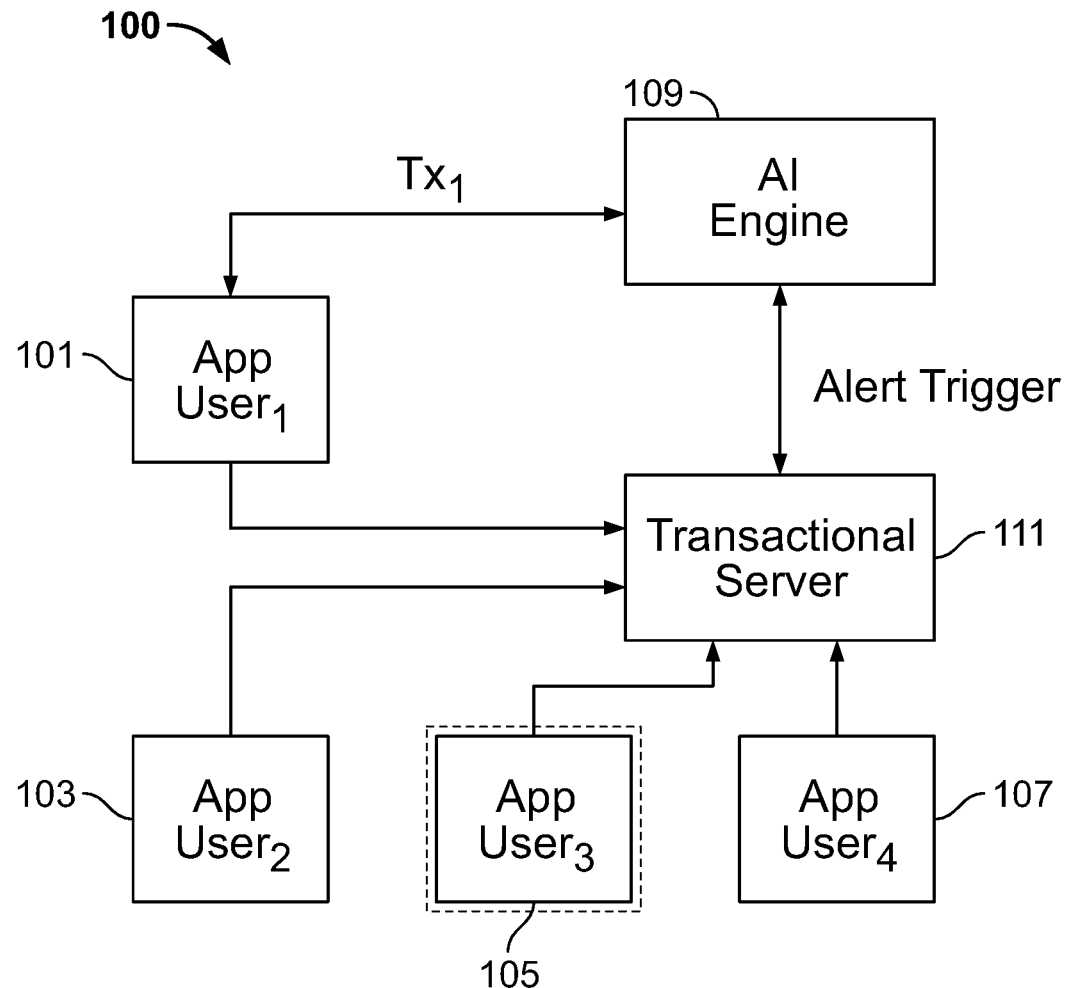
FIG. 1 shows an illustrative system in accordance with principles of the disclosure.

Apparatus and methods for artificial intelligence ("AI") notification platform are provided. The platform may notify a user about a potential alert triggered in connection with a target transaction. The AI engine may create an alert trigger on behalf of a user. The AI engine may create the alert trigger based on learning from past user behavior or actions. For example, the AI engine may learn from historical alerts entered by the user.

The platform may allow a user to create a customized alert trigger. The user may customize alert triggers previously created by the AI engine. The platform may allow the user to apply an actionable response to an alert trigger. The AI engine may generate actionable responses that may be applied by the user. The platform may transmit "peace-of-mind" notifications to the user informing the user that an actionable response has been successfully implemented. Notifications may also provide the user with confirmation that an issue flagged in an alert trigger has been resolved.

The alert triggers may detect potential misuse of corporate funds. For example, alert triggers may detect anomalous payments, payment status, payment approvals and administrative approvals. The platform integrates user action and an AI engine to provide actionability and notification across complex webs of corporate payments. Typically, tracking monitoring and taking action with respect to individual transactions within a complex web are beyond the ability of a human user. However, the AI engine may apply machine learning techniques to a user's manual inputs with respect to a relatively smaller number of transactions. The AI engine may then learn and understand the user's alert triggers to a larger universe of transactions within the complex web.

The platform may include one or more computer systems. A computer system may host an AI engine. The AI engine may utilize one or more machine learning techniques. The AI engine may utilize any suitable machine learning technique. Exemplary algorithms may include one or of the following machine learning techniques: Naïve Bayes Classifier Algorithm, K Means Clustering Algorithm, Support Vector Machine Algorithm, Apriori Algorithm, Linear Regression, Logistic Regression, Artificial Neural Networks, Nearest Neighbors, Random Forests and/or Decision Trees. Any suitable machine learning technique may be utilized.

An illustrative computer system may be a network connected computer system. Computer systems, as disclosed herein, may include a processor circuit. The processor circuit may control overall operation of the computer system and its associated components. The processor circuit may include hardware, such as one or more integrated circuits that form a chipset. The hardware may include digital or analog logic circuitry configured to perform any suitable (e.g., logical) operation.

For example, a system may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning techniques, AI algorithms, alert trigger criteria, actionable responses or any other suitable information or data structures. Components of the system may be linked by a system bus, wirelessly or by other suitable interconnections. System components may be present on one or more circuit boards. In some embodiments, the components may be integrated into a single chip. The chip may be silicon-based.

The system may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor circuit that enable the system to perform various functions. For example, the non-transitory memory may store software applications such as an operating system, application programs, and an associated database. Some or all of computer executable instructions of the system may be embodied in hardware or firmware components of the computer system.

The computer system may include cloud computing and virtualization implementations of software. Such implementations may be designed to run on a physical system supplied externally by a hosting provider, a client, or other virtualized platform.

Software application programs, which may be used by the computer system, may include computer executable instructions for invoking user functionality related to communication, such as email, short message service ("SMS"), and voice input and speech recognition applications. Software application programs may utilize one or more algorithms that formulate predictive machine responses, formulate database queries, process human caller inputs, process human agent inputs, or any other suitable tasks.

The computer system may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the computer system may be operated in a client-system configuration to permit retrieval of web pages from a web-based system. Web browsers can be used to display and manipulate data on web pages.

The computer system may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

The computer system may include, and may be operational with, numerous other general purpose or special purpose computing system environments or configurations. Examples of well-known computing systems, environments, and/or configurations that may be suitable for use with this disclosure include, but are not limited to, personal computers, system computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

The computer system may utilize computer-executable instructions, such as program modules, executed by a processor. Generally, program modules include routines, programs, objects, components, data structures, etc. that perform particular tasks or implement abstract data types. The computer system may be operational with distributed computing environments where tasks are performed by remote processing devices that are linked through a communications network. In a distributed computing environment, program modules may be located in both local and remote computer storage media including memory storage devices. The computer system may rely on a network of remote systems hosted on the Internet to store, manage, and process data (e.g., "cloud computing" and/or "fog computing").

Computer systems disclosed herein may be produced by different manufacturers. For example, a user may use a mobile device to access the AI engine running on a first computer system. The AI engine may utilize two or more machine learning technique running on a network. The AI algorithm may access a database to make decisions based on user actions.

Computer systems may capture data in different formats. Computer systems may use different data structures to store captured data. Computer systems may utilize different communication protocols to transmit captured data or communicate with other systems. Despite such operational differences, systems may be configured to operate substantially seamlessly across different systems operating systems, hardware or networks.

A machine learning method is provided. The method may include receiving an alert trigger. The alert trigger may be received from a system user. The alert trigger may be associated with a target transaction. For example, the user may use a mobile device to request status updates on a treasury payment. Based on the alert trigger, methods may include determining an actionable response for the target transaction in response to detecting the alert trigger. An alert trigger may detect activity associated with a target transaction that indicates unauthorized approval for the transaction.

For example, the user may wish to ensure that a payroll transfers to foreign employees are executed with a predetermined timeframe. Transfers not completed with the predetermined timeframe, may indicate misuse of the designated payroll funds. Alternatively, the user may wish to ensure that all payments to vendors have obtained the proper pre-authorization. Such pre-authorization may prevent erroneous payments or other misuse of corporate funds.

However, conventionally, after alerting a user to an anomalous transaction or potential misuse of funds, there are no tools for taking action in response to the detected potential misuse. Methods may include determining an actionable response for the target transaction. The actionable response may be determined by artificial intelligence using machine learning techniques.

The actionable response may provide the user with machine generated remedies that may be taken in response to a detected alert trigger. For example, a user may pause a transaction or require additional approval before a target transaction is executed. An actionable response may include suspending authority of another user to initiate transactions that exceed a threshold amount or any other suitable criteria.

Methods may apply a machine learning technique to detect an alert trigger. In response to detecting the alert trigger, methods may include formulating a notification. The notification may be formulated by the AI engine. The notification may include the alert trigger and instructions for deploying an actionable response. The actionable response may be a machine generated option for responding to the alert trigger.

Methods may include providing the system user with the notification using a first strategic communication channel. The first strategic communication channel may be determined by the AI engine using machine learning techniques. For example, the AI engine may determine a communication channel based on a priority or severity of the alert trigger. If the AI engine determines that the alert trigger requires an immediate real-time actionable response by the user, the AI engine may attempt to call or text the user on a mobile device. If the AI engine determines that the alert trigger is lower priority, the AI engine may transmit an email notification.

The strategic communication channel determined by the AI engine may also depend on how the AI engine reacts to detecting the alert trigger. When the AI engine detects a high priority alert trigger, the AI engine may immediately suspend or pause execution of the target transaction. By suspending execution of the target transaction, the user may not need to be immediately notified of the alert trigger.

In response to receiving instructions deploying the actionable response, methods may include applying the actionable response to the target transaction. Methods may include formulating a confirmatory alert after applying the actionable response. Methods may include transmitting the confirmatory alert to a system user using a second strategic communication channel. The second strategic communication channel may be determined using machine learning techniques. The second strategic communication channel may be utilized for transmitting lower priority communications to the user.

Methods may include applying the machine learning techniques to an alert trigger associated with a target transaction and determining a plurality of alert triggers. The plurality of alert triggers may be associated with the target transaction. The plurality of alert triggers may be associated with other transactions. The plurality of alert triggers may be alert triggers the AI engine has determined are relevant to a system user who created the original alert trigger. The AI engine may determine the plurality of alert triggers based, at least in part, on criteria associated with of the original alert trigger provided by the system user.

A system user may enter criteria for at least one alert trigger, and the AI engine may determine additional alert triggers of interest to the user. The AI engine may provide computational tools for managing alert triggers within a complex web of transactions. Without computational tools provided by the AI engine, it would not be possible for the human to discover anomalous transactions that may be indicative to misuse.

Notification of the plurality of alert triggers (when detected), may be transmitted to a system user using communication channel commensurate with a priority level of the detected alert trigger. The level of priority associated with an alert trigger may be determined based on the strategic communication that the AI engine determines would have been utilized for communicating notification an alert trigger created by the system user. The plurality of alert triggers determined by the AI engine may be of varying priority levels.

For example, a high priority notification may be transmitted using a communication channel that transmits the notification to the system user in real-time. A lower priority notification may be transmitted using a communication channel that is less intrusive and allows the system user to read the notification or implement an actionable response when convenient.

Methods may include formulating a corresponding actionable response for each of the plurality of alert triggers formulated by the AI engine. When any of the plurality of alert triggers are detected, the AI engine may activate what it determines to be an appropriate communication channel. Using the appropriate communication channel, the AI engine may initiate transmission of a notification informing the system user that an alert trigger has been detected.

A notification formulated by the AI engine may include an actionable response that is responsive to a detected alert trigger. The notification transmitted to the system user may include the detected alert trigger and instructions for deploying an actionable response that remediates the detected alert trigger.

In response to receiving instructions from the system user deploying a corresponding actionable response, methods may include applying the actionable response to the target transaction. Methods may include transmitting instructions or otherwise communicating with a transactional server. For example, the actionable response may pause or cancel a target transaction. The actionable response may suspend access of another system user to the transactional server. Suspending access may prevent the other system user from issuing instructions to the transactional server to initiate transactions. Suspending access may require that the other system user obtain prior authorization before the transaction server executes any instructions issued by the other system user.

Methods may include applying machine learning techniques to the alert trigger. The machine learning techniques may be trained to determine a plurality of alert triggers. The machine learning techniques may determine a plurality of alert triggers that, if detected, would trigger the same actionable response associated with the alert trigger manually entered by a system user. The AI engine may determine that the machine generated alert triggers would be remediated by the same actionable response as the alert trigger provided by the system user are therefore also of interest to the system user.

Methods may include monitoring transaction activity on the transactional server for any of the plurality of alert triggers. When activity indicative of any of the plurality of alert triggers are detected, methods may include providing the system user notification that includes the detected alert trigger. The provided notification may also include instructions for deploying an actionable response that remediates the detected alert trigger. The system user may trigger the actionable response directly from within the notification. In response to receiving instructions deploying an actionable response, methods may include applying the actionable response to the target transaction associated with the detected alert trigger.

Methods may include applying a machine learning technique to detect multiple transactions that each share attributes in common with the target transaction identified in an alert trigger manually entered by a system user. Methods may include detecting a plurality of alert triggers for other transactions based on the common attributes. Methods may include applying machine learning techniques to detect multiple transactions within a complex web of transaction that each share attributes in common with the target transaction. Methods may include formulating alert triggers for each of the multiple transactions. Methods may include formulating corresponding actionable responses for each of the multiple transactions.

A system user may be a first system user. Methods may include detecting an alert trigger for a target transaction by detecting action or inaction by a second system user in connection with the target transaction. Methods may include formulating additional alert triggers for the target transaction (or other transactions) associated with the action or the inaction by second system user in connection with the target transaction.

Methods may include applying machine learning techniques to detect multiple transactions that each require input from the same system user. Methods may include formulating a confirmatory notification informing the system user after successful execution of any of the multiple transactions.

Methods may include applying machine learning techniques and adjusting the alert trigger. Methods may include adjusting the alert trigger based on actions taken by any system user after receiving a user formulated alert trigger. For example, second system user may change one or more attributes of the target transaction after an alert trigger was created by a first system user. The AI engine may employ machine learning techniques to determine, based on the subsequent changes, how to detect the manually entered alert trigger. The AI engine may determine that based on the subsequent change, activity of additional system users may be monitored to detect the alert trigger.

Methods may include adjusting the actionable response. The AI engine may adjust the actionable response after receiving the instructions from the system user deploying the actionable response. For example, another system user may change one or more attributes of a target transaction before the system user implements an actionable response in response to a detected alert trigger. The AI engine may dynamically account for these changes and other circumstances that may not be known to the system user that originally created the alert trigger.

An artificial intelligence ("AI") notification platform is provided. The platform may include a secure treasury application running on a mobile device. The platform may include a secure transactional server. The secure transactional server may be accessible from the mobile device via the secure treasury application. The platform may include a remote computer system. The remote computer system may host an artificial intelligence ("AI") engine.

The secure treasury application may provide an interface for a system user of the mobile device to request notification when a first alert trigger is detected. The system user may manually enter criteria for detecting the first alert trigger. The criteria may include activity in connection with a target transaction executable by the secure transaction system. In response to receiving the request for notification from the system user, the AI engine may initiate a tracing of the target transaction on the secure transactional server.

Tracing a target transaction may include registering any action taken with respect to the target transaction. An action may include an approval received from another user, a change in status (e.g., executed, failed, pending), change in a payment amount, payment date or any change in a transaction attribute (see, Table 1). Actions with respect to the target transaction may include any action with respect to any transaction that may impact the target transaction. For example, the target transaction may be a payment to a vendor. The funds for the target transaction may be dependent on another payment. Changes to any attributes of the other payment may be included in the tracing by the AI engine.

The AI engine may detect a second alert trigger. The second alert trigger may be detected based on activity on the secure transactional server in connection with the target transaction. The second alert trigger may be detected in response to activity associated with a transaction downstream or upstream relative to the target transaction.

The AI engine may formulate and transmit a push notification to the system user's mobile device. The push notification may include an actionable response that can be implemented directly from within the push notification. After detecting the alert trigger, the AI engine may pause execution of the target transaction on the secure transactional server. The AI engine may pause execution of the target transaction pending action of the system user with respect to the actionable response included in the push notification.

For example, in response to detection of an alert trigger corresponding to unusual behavior by a user with respect to a target transaction, an illustrative actionable response may include deactivating the user's access to the transaction server.

Unusual behavior may include approving a larger number of payments than typically approved daily by the user. The AI engine may transmit a push notification to a manager stating that "User has approved an unusual number of payments today, click HERE to deactivate user access or click HERE to temporary pause user access while investigating this matter."

Unusual behavior may include a user using credentials to access the transactional server from unusual locations. For example, an alert trigger may be detected in response to a user accessing the transactional server from an Asian country when the user is based in New York. A push notification may be transmitted to a manager of the user. The push notification may provide the following message: "Is User traveling? We've noticed access attempts from Asia. Click HERE to deactivate user access or click HERE to validate this behavior."

Unusual behavior may include a user using credentials to access the transactional server at unusual hours. For example, an alert trigger may be detected in response to a user accessing the transactional server at 2 am EST. Typically, the user may access the transactional server 9-5 pm EST. A push notification may be transmitted to a manager of the user. The push notification may provide the following message: "We're noticing access attempts at unusual hours. Click HERE to deactivate user access or click HERE to validate this behavior."

In response to detecting that the actionable response has been clicked within the notification, the AI engine may apply the actionable response to the target transaction. When the AI engine does not detect implementation of the actionable response within a threshold time, the AI engine may apply a machine generated actionable response to the target transaction. The threshold time-period may be measured relative to a time the notification was transmitted to the user.

The machine generated or user actuated actionable response may include cancelling the target transaction or extending the pausing of the target transaction. The machine generated or user actuated actionable response may include escalating an investigation of the activity that caused detection of the alert trigger. For example, in response to detecting an alert trigger, the AI engine may set a flag associated with the target transaction. The flag may signal to the transactional server that the target transaction is to be processed differently. For example, the flag may indicate the transactional server is not to allow execution of the target transaction unless a specific user approves the target transaction.

The AI engine may formulate a series of push notifications for the target transaction. The series of push notifications may notify a system user that two or more alert triggers have been detected. The series of push notification may be associated with a plurality of transactions. Each of the plurality of transactions may be associated with a system user within the secure treasury application.

The series of push notifications may be machine generated based on the user entered criteria for a first alert trigger. The series of push notifications may notify a system user that one or more machine generated alert triggers have been detected. The AI engine may apply machine learning techniques to a user's manual inputs that define an alert trigger. The AI engine may then learn and extrapolate the user's criteria to a larger universe of activity to formulate criteria for machine generated alert triggers.

In some embodiments, the system user that creates an alert trigger may create a corresponding actionable response. The system user may create a corresponding actionable response for a machine generated alert trigger. In some embodiments, the AI engine may generate an actionable response for a detected alert trigger. In some embodiments, the AI engine may add actionable responses to an actionable response formulated by a human user. Both user and machine generated actionable responses may be implemented directly from within the push notification. Alert triggers and actionable responses generated by the AI engine may provide relevant notification and actionability for a target transaction within a complex web of transactions, a task that would otherwise not be humanly possible.

The AI engine may formulate an actionable response based on activity of the system user within the secure treasury application. For example, the platform may monitor transactions viewed by the system user. The platform may monitor approvals of transactions provided by the system user. The platform may monitor transactions initiated by the system user. The AI engine may formulate an actionable response based on an event that caused the AI engine to detect an alert trigger.

The AI engine may formulate an actionable response to a detected alert trigger in real-time, each time an alert trigger is detected. An actionable response may be formulated in real-time based on time a time of day the alert trigger is detected. The AI engine may formulate different actionable response for different alert trigger detection times. For example, if the AI engine does not expect a system user to respond in real-time to a notification, the AI engine may formulate an actionable response that does not require a real-time response. In the interim the AI engine may apply a stop-gap measure, such as suspending execution of the target transaction pending further responsive action by the system user.

Apparatus for an artificial intelligence ("AI") notification platform is provided. The platform may include a first instance of a secure treasury application. The first instance of the secure treasury application may be run on a first mobile device. The platform may include a second instance of the secure treasury application. The second instance of the secure treasury application may be run on a second mobile device.

The platform may include a secure transactional server. The transactional server may be accessible from the first and second mobile devices via the first and second instances of the secure treasury applications. The first and second instances of the secure treasury application may authenticate the first and second mobile devices to access the secure treasury server.

The platform may include a remote computer system. An AI engine may be run on the remote computer system. The first instance of the secure treasury application may provide an interface for the first mobile device to request a notification associated with a target transaction. The notification may be transmitted to the requesting first mobile device in response to the AI engine detecting an alert trigger associated with the target transaction. An alert trigger may include a plurality of related events or actions associated with the target transaction.

For example, the AI engine may detect processing steps applied to the target transaction by the transaction server. As a further example, the AI engine may detect a viewing of the target transaction on the second mobile device. In response to detecting the viewing, the AI engine may initiate tracing of actions associated with the target transaction on the secure transactional server.

The viewing of the target transaction on the second mobile device may indicate that a user of the second may be planning to take action with respect to the target transaction. The tracing may allow the AI engine to detect whether the secure transactional server receives executable instructions submitted by the second mobile device in connection with target transaction.

In response to detecting an alert trigger, the AI engine may formulate an actionable response. The AI engine may formulate the actionable response based on one or more attributes of the target transactions. Table 1 shows illustrative transaction attributes.

TABLE 1

| Illustrative Transaction Attributes | Illustrative Associated Value |
| --- | --- |
| Geographic attributes of user when accessing the transactional server | Longitude/latitude<br>GPS coordinates<br>Map coordinates<br>Elevation<br>Depth<br>Distance from a point<br>Address<br>Zip code<br>Area code<br>County<br>State<br>Country<br>IP address<br>Signal triangulation |
| Temporal attributes of user when accessing the transactional server | Seconds<br>Minutes<br>Hours<br>Day<br>Week<br>Month<br>Year<br>Duration |
| Synoptic attributes at when user accesses the transactional server | Weather at time of transaction<br>Stock market performance at time of transaction<br>Political party in power at time of transaction<br>Transaction participant credit risk |
| Target transaction attributes | Amount (e.g., $)<br>Currency<br>Foreign exchange rate<br>Source<br>Destination<br>Execution urgency<br>Purpose (e.g., payroll, invoice)<br>Manager approval requirements |
| User attributes | Line-of-business<br>Supervisor<br>Authority level<br>Job description |
| User access history | Number of transactions authorized<br>Number of transactions approved<br>Number of transactions denied<br>Number of alert triggers detected regarding user<br>Number of actionable responses applied to detected alert triggers<br>Avg. transaction volume ($)<br>Avg. transaction volume (#)<br>Transaction volume at specified time<br>Transaction volume at specified location<br>Source/destination of transactions |
| Access Channel | Desktop<br>Online portal<br>Mobile device<br>In person |

The AI engine may formulate the actionable response based on executable instructions submitted by the second user to the transactional server. For example, the AI engine may pause execution of the submitted executable instructions on the secure transactional server. The actionable response may include options for cancelling or overriding the executable instructions or other actions of the second user with respect to the target transaction.

The AI engine may transmit a notification to the first user. The notification may be a push notification that is displayed on the first mobile device. The notification may include a mechanism for deploying an actionable response. The notification may include a first mechanism for deploying the actionable response and a second mechanism for un-pausing the executable instructions. Un-pausing the executable instructions may allow the actions of the second user to be applied by the secure transactional server to the target transaction.

Actuation of the first mechanism may instruct the AI engine that the first user does not authorize the executable instructions or other action of the second user with respect to the target transaction. The AI engine may instruct the secure transaction system to apply the actionable response to the target transaction. The actional response may override the executable instructions submitted by the second user.

Actuation of the second mechanism may provide the AI engine with confirmation that the first user authorizes the executable instructions or other actions of the second user. The AI engine may instruct the secure transactional server to apply the executable instructions submitted by the second user to the target transaction.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes mobile device 101 running a first instance of a secure treasury application. Mobile device 103 is running a second instance of the secure treasury application. Mobile device 105 is running a third instance of the secure treasury application. Mobile device 107 is running a fourth instance of the secure treasury application.

FIG. 1 shows that all four of mobile devices 101-107 are in communication with transactional server 111. Using the instances of the secure treasury applications running on the respective mobile devices, each of mobile devices 101-107 may issue executable instructions to transactional server 111. The executable instructions may direct transactional server 111 to take one or more actions with respect to a target transaction.

For example, the executable instructions may initiate the target transaction. The executable instructions may change (e.g., increase) the amount of funds transferred from a source to a destination by the target transaction. The executable instructions may change (e.g., earlier/later) a time funds are transferred from the source to the destination by the target transaction.

System 100 includes AI engine 109. AI engine 109 may monitor or trace activity on transactional server 111 with respect to the target transaction. AI engine 109 may initiated tracing of the target transaction in response to a request received from a mobile device. For example, a mobile device may request notification when an alert trigger is detected. The alert trigger may be detected when a status of the target transaction changes. The status of the target transaction may change because the target transaction has obtained execution approval is now ready for execution by transactional server 111.

AI engine 109 may formulate additional alert triggers for the target transaction. FIG. 1 shows that AI engine 109 has flagged activity of mobile device 105 as a potential alert trigger. AI engine 109 may determine that the additional alert triggers are likely to be of interest to the user that requested the original alert trigger. FIG. 1 shows that mobile device 101 has requested an alert trigger associated with target transaction $T_{x1}$. FIG. 1 shows that AI engine 109 has detected an alert trigger associated with mobile device 105. AI engine 109 may have detected that mobile device 105 has attempted to change one or more attributes associated with target transaction $T_{x1}$ (see, e.g., Table 1).

Figure 2:
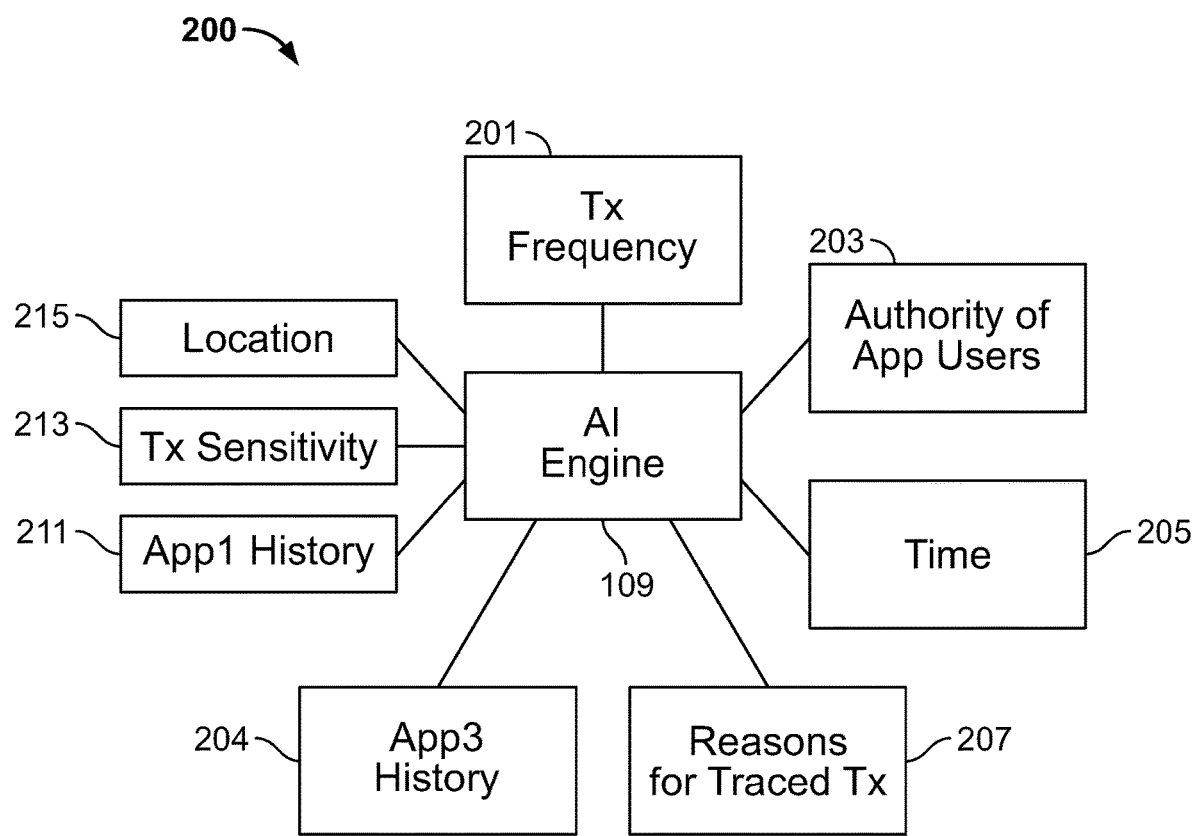
FIG. 2 shows an illustrative apparatus in accordance with principles of the disclosure.

FIG. 2 shows illustrative criteria 200 that may be monitored by AI engine 109 with respect to target transaction $T_{x1}$ (shown in FIG. 1). The criteria shown in FIG. 2 may also be specified by a system user when the user manually creates an alert trigger.

Criteria 200 include transaction frequency 201. AI engine 109 may expect a target transaction associated with a threshold frequency to have similar attributes, such as amount, source, destination and approval processes to other transactions associated with a particular user or mobile device.

Criteria 200 include authority of users 203. A target transaction may require approval before being executed. AI engine 109 may monitor whether the required approvals have been obtained. When required approvals have been received by transaction server 111, AI engine 109 may transmit notification to a mobile device 101 which initiated the target transaction. In response to detecting an alert trigger, AI engine 109 may require that a target transaction obtain approval from one or more other users.

Criteria 200 include time 205. AI engine 109 may monitor time 205 that passes after a target transaction has been initiated. If required approvals for the target transaction have not been received within a threshold time after initiation, AI engine 109 may transmit a notification to mobile device 101 which initiated the target transaction. The notification may inform initiator mobile device 101 which approvals are still needed. An actionable response for the target transaction may include sending a reminder to users to submit their approval of the target transaction.

Time 205 may also be used to detect an alert trigger. For example, if a user accesses transactional server 111 outside of typical working hours, AI engine 109 may formulate a notification advising of the unusual user activity. An actionable response formulated by AI engine 109 may include suspending the user's access to transactional server 111. An actionable response may include requiring that any transactions initiated by the user obtain additional approval.

Criteria 200 include tracing reasons 207. AI engine 109 may leverage reasons that triggered tracing of a target transaction to determine additional alert triggers. The additional alert triggers may be associated with the target transaction. The additional alert triggers may be associated with other transactions. The additional alert triggers may apply criteria entered by a user with respect to a target transaction to other transactions.

Criteria 200 includes user history 209. AI engine 109 may examine historical interactions of a user with transactional server 111 to determine whether a detected alert trigger is the result of typical user behavior. For example, in FIG. 1, AI engine 109 may determine that instructions received from mobile device 105 deviate from typical activity patterns received from mobile device 105.

Criteria 200 include initiating user history 211. User history 211 may examine historical interactions of a user with transactional server 111 to determine a set expected attributes for a target transaction initiated by a user. For example, in FIG. 1, AI engine 109 may determine that when a target transaction is initiated by mobile device 101, the target transaction requires approval from three other users, may a transfer of a threshold amount from a source to a destination and may require execution within 48 hours. AI engine 109 may detect activity associated with the target transaction that deviates from the expected transaction attributes. In response to detecting any such deviation, AI engine 109 may detect an alert trigger and formulate a notification and actionable response.

Criteria 200 include transaction sensitivity 213. AI engine 109 may apply more detailed tracing for target transactions that have a higher sensitivity. Transaction sensitivity 213 may indicate whether a target transaction is "mission critical" or that the target transaction must be executed by a deadline. Based on transaction sensitivity 213, AI engine 109 may formulate a notification and associated actionable response.

For example, AI engine 109 may detect that required approvals have not yet been obtained for a target transaction. AI engine 109 may determine that unless a user is alerted, the needed approvals may not be obtained prior to the execution deadline for the time-sensitive target transaction. AI engine 109 may formulate a notification that informs an initiating user which approval are still missing and associated actionable response for contacting the users that need to submit their approvals.

Criteria 200 include location 215. Location 215 may represent a location of a user that attempts to access transactional server 111. AI engine 109 may determine whether user is authorized to access transactional server 111 from the location. AI engine 109 may classify user activity as being unusual based on a location where the activity is taking place. For example, if a user accesses transactional server 111 at 2 am from a given location, AI engine 109 may detect an alert trigger for the target transaction. If a user accesses transactional server 111 from a location that is outside a typical operational zone of the user, AI engine 109 may detect an alert trigger for the target transaction.

Figure 3:
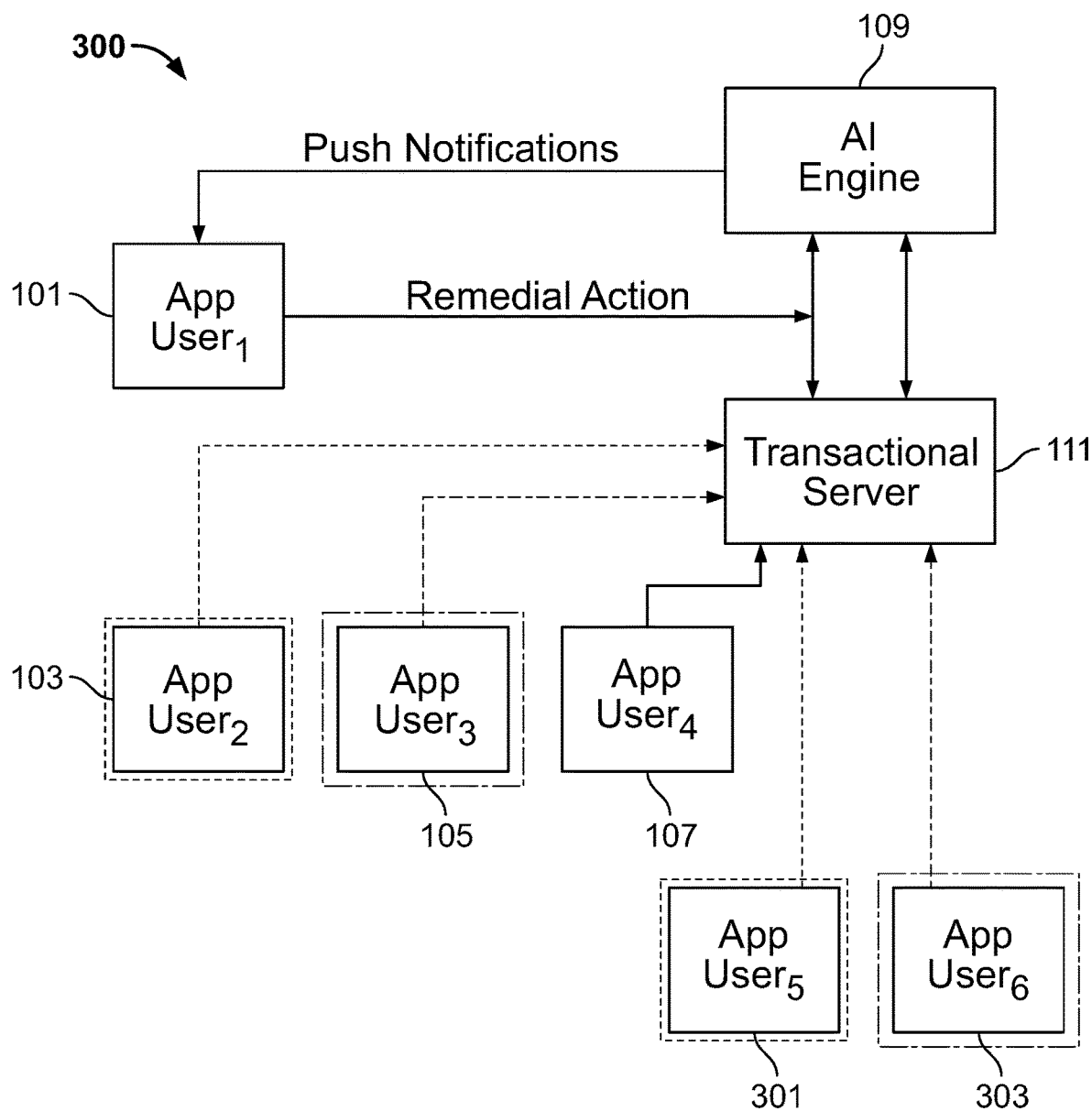
FIG. 3 shows an illustrative scenario and apparatus in accordance with principles of the disclosure.

FIG. 3 shows illustrative scenario 300. Scenario shows that AI engine 109 has transmitted a push notification to mobile device 101. The transmitted push notification may include actionable responses that may be triggered directly from within the push notification. The actionable responses may provide options for remediating an alert trigger identified in the push notification.

Scenario 300 shows that AI engine 109 flagged mobile devices 103 and 301 as being associated with the detected alert trigger. AI engine 109 may flag mobile devices 103 and 301 because they have taken actions that caused detection of an alert trigger. AI engine 109 may flag mobile devices 103 and 301 because they will need to take action if mobile device 101 implements the actionable response in response to a detected alert trigger.

AI engine 109 may also flag mobile devices 105 and 303. AI engine 109 may identify mobile devices 105 and 303 for tracing future activity that may cause detection of an alert trigger for the target transaction. Mobile device 101 may not have identified mobile devices 105 and 303 in a manually entered alert trigger. In response to receiving an alert trigger for a target transaction from mobile device 101, AI engine 109 may identify mobile devices 105 and 303 as also being relevant to detection of an alert trigger.

After identifying mobile devices 105 and 303, AI engine 109 may begin monitoring activity of mobile devices 105 and 303. AI engine 109 may transmit a push notification to mobile device 101 if activity of mobile devices 105 and 303 cause detection of an alert trigger. AI engine 109 may detect an alert trigger caused by mobile devices 105 and 303 based on tracing one or more of criteria 200 associated with mobile devices 105 and 303.

FIG. 4 shows illustrative actions 400 that may be taken by AI engine 109. Actions 401 show that user 2 has initiated a payment that requires approval. Actions 401 show that initiating this payment has caused detection of an alert trigger because user 2 has now initiated an excessive number of payments. Actions 401 show that AI engine 109 has formulated an actionable response that includes tracing access of user 2 to transactional server 111. User 2 may not have been associated with any previous alert triggers. Therefore, AI engine 109 has not limited access of user 2 to transactional server 111. By initiating a tracing of user 2 activity, AI engine 109 may monitor future activity of user 2 and determine whether that activity warrants limiting access of user 2 to transactional server 111.

Actions 403 show that user 3 has attempted to access transactional server 111 an unusual number of times. AI engine 109 has therefore detected an alert trigger. Actions 403 show AI engine 109 has formulated an actionable response that limits access of user 3 to transactional server 111. User 3 may now need to request formal approval to regain full access to transactional server 111.

Actions 405 show that user 4 has approved a payment. AI engine 109 has therefore detected an alert trigger and has transmitted a confirmatory notification to the user that initiated the transaction and was waiting for approval from user 4.

Actions 407 show that AI engine 109 has detected that user 5 has approved a payment initiated by user 2. AI engine 109 has therefore detected an alert trigger in connection with user 5 because an alert trigger has been detected in connection with user (actions 401, excessive number of transaction approvals). AI engine 109 has also determined an actionable response that pauses the transaction approved by user 5. AI engine 109 may determine an actionable response based on one or more of criteria 200 associated with a target transaction. AI engine 109 may include the actionable response in a push notification transmitted to user 5 in connection with the detected alert trigger.

Actions 409 show that AI engine 109 has detected that user 6 has approved a payment initiated by user 3. AI engine 109 has detected an alert trigger in connection with user 6 because an alert trigger has been detected in connection with user 3 (actions 403, excessive access attempts). AI engine 109 has determined that an appropriate actionable response is to limit access of user 6 to transactional server 111. AI engine 109 may determine an actionable response based on one or more of criteria 200 associated with a target transaction. AI engine 109 may include the actionable response in a push notification transmitted in connection with the detected alert trigger.

Figure 5:
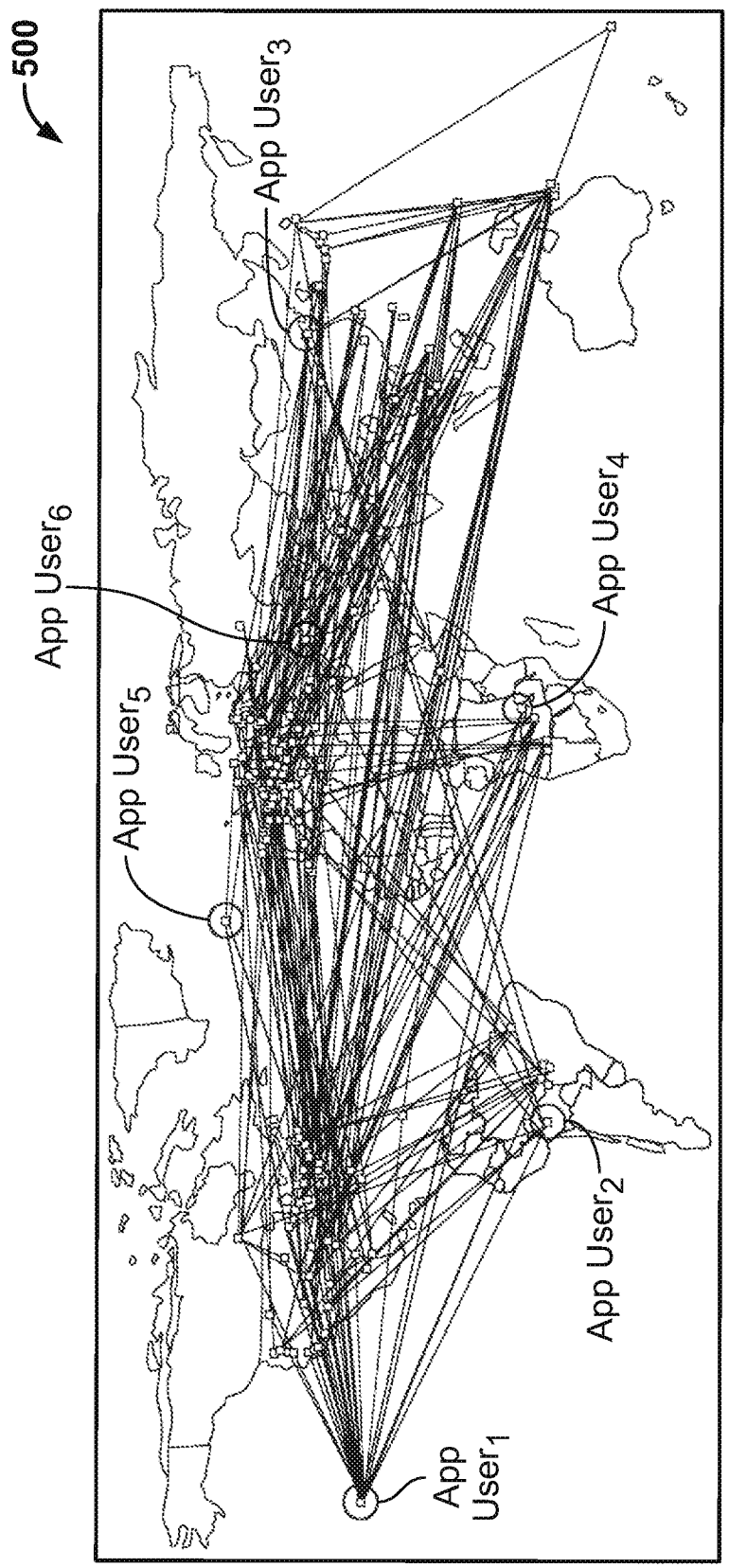
FIG. 5 shows an illustrative apparatus and scenario in accordance with principles of the disclosure.

FIG. 5 shows illustrative complex transaction web 500. Transaction web 500 shows an illustrative representation of the complexity of relationships among transactions processed by transactional server 111. Transaction web 500 shows that users 1-6 are positioned in different geographic locations across the world. Users 1-6 may each initiate and approve transactions at different times of day from their different locations. Transaction web 500 may include additional users that initiate or approve transactions.

Transaction web 500 conveys the intricacy and complexity that may be associated with a target transaction processed by transactional server 111. Interrelations linking the target transaction to other transactions may be too complex to be managed by a human user. AI engine 109 may be needed to monitor activity on transactional server 111, detect alert triggers for the target transaction sand formulate actionable responses to the detected alert triggers.

Figure 6:
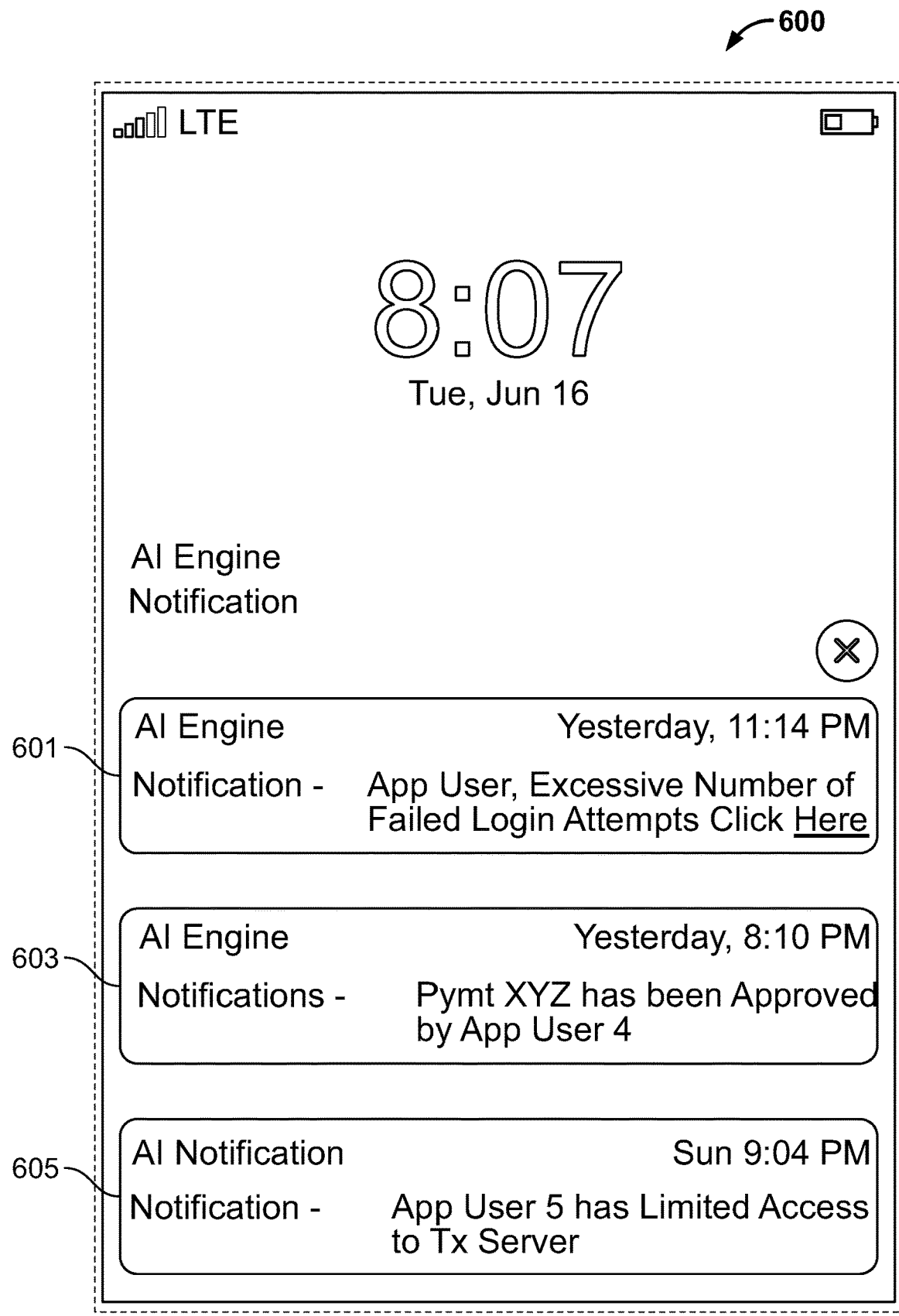
FIG. 6 shows an illustrative information in accordance with principles of the disclosure.

FIG. 6 shows illustrative push notifications 600 received by a mobile device. Push notification 601 shows that AI engine 109 has detected an alert trigger corresponding to an excessive number of failed access attempts to transactional server 111. Push notification 601 also shows that AI engine 109 has formulated an actionable response that may be accessed directly from within push notification 601 using the "Click Here" option.

Push notification 603 shows that AI engine 109 has detected an alert trigger that payment XYZ has been approved by App User 4. Push notification 603 may be an informative peace-of-mind notification that is not associated with an actionable response. Push notification 605 shows that AI engine 109 has applied an actionable response that limits access of App User 5 to transactional server 111.

Figure 7:
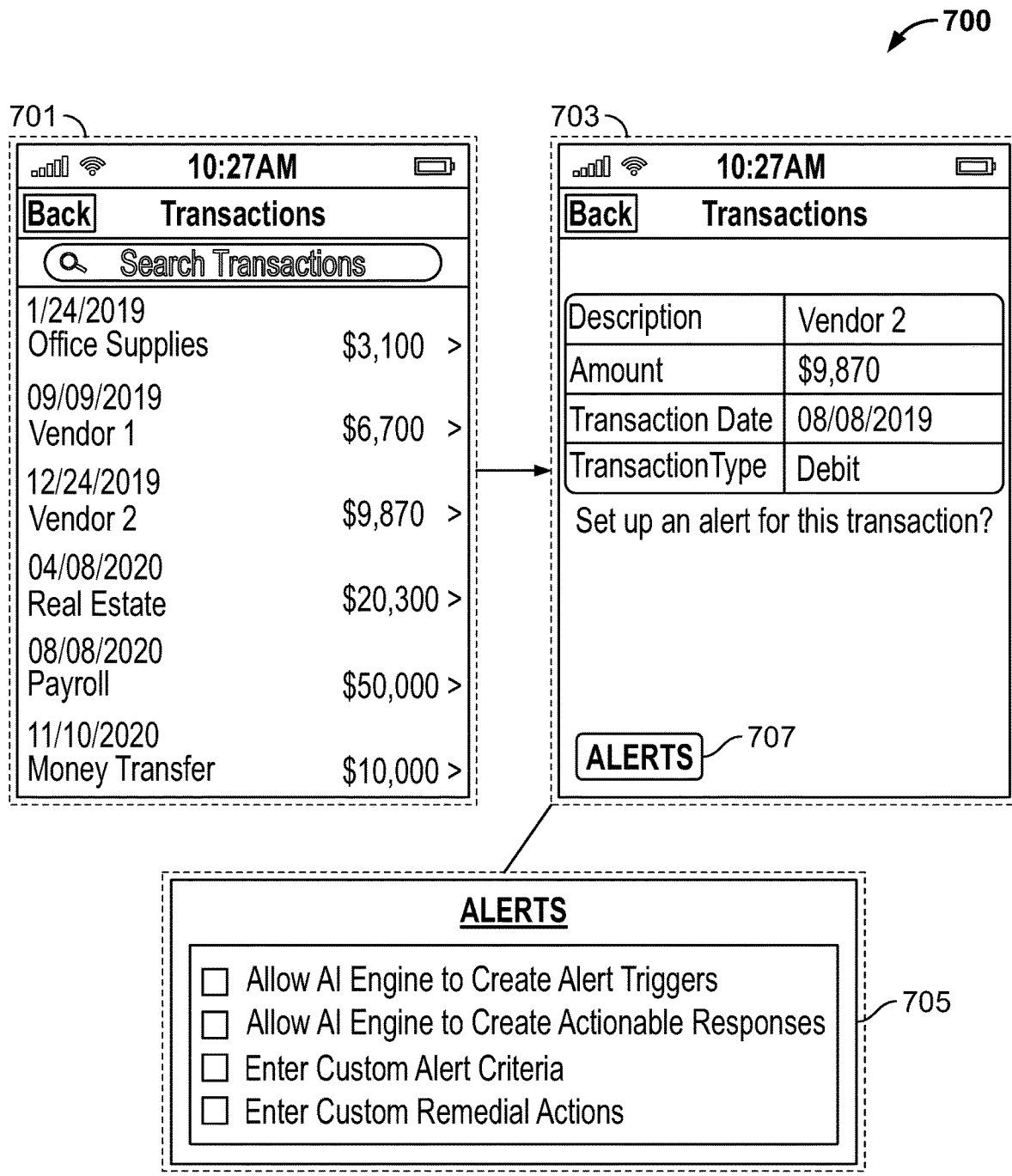
FIG. 7 shows an illustrative user interface in accordance with principles of the disclosure.

FIG. 7 shows illustrative user interface 700. User interface 700 allows a user to enter custom alert trigger criteria that will be monitored by AI engine 109. Screen 701 shows exemplary transactions that may be displayed within user interface 700. A user may select a displayed transaction to view additional details. Screen 703 shows details associated with a debit transaction for Vendor 2 initiated on Dec. 24, 2019. Screen 703 includes option 707 for manually entering criteria for an alert trigger for the selected transaction.

Screen 705 shows options presented after a user selects option 707. Screen 705 shows that a user may check a box to instruct AI engine 109 to create machine generated alert triggers associated with the selected transaction. Screen 705 shows that the user may check a box to instruct AI engine 109 to create machine generated actionable responses to remediate any detected alert triggers. Screen 705 shows that the user may check a box to manually enter criteria for an alert trigger associated with the selected transaction. Screen 705 shows that the user may check a box to manually enter criteria for an actionable response that remediates a detected alert trigger. The user may manually enter an actionable response regardless of whether the alert trigger was machine generated or manually entered.

FIG. 8 shows illustrative criteria 800 that have been manually input by a user for an alert trigger. Criteria 800 show that AI engine 109 has been instructed to detect an alert trigger when a payment to vendor 2 exceeds $15,000 during a third annual quarterly period. Criteria 800 show that AI engine 109 has been instructed to require additional approval from users 5 and 6 when a payment to vendor 2 is initiated between 9 AM-5 AM within an Asian or European time zone.

Criteria 800 show that AI engine 109 has been instructed to reject any payment to vendor 2 unless they are initiated by users 1, 2 or 3. Criteria 800 also show that even users 1, 2 or 3 may only initiate payments to vendor 2 using a desktop device and not a mobile device. Criteria 800 also show that AI engine 109 has been instructed to create additional machine generated alert triggers based on criteria 800 entered by the user.

For example, AI engine 109 may monitor other user activity and transactions that may impact payments to vendor 2. As shown in FIG. 5, because of the intricate relationships among transactions processed by transactional server 111, it may not be possible for a human user to identify and track all criteria for all interrelated transactions that may impact payments to vendor 2.

Thus, methods and apparatus for ACTIONABLE ARTIFICIAL INTELLIGENCE ("AI") NOTIFICATION PLATFORM are provided. Persons skilled in the art will appreciate that the present invention can be practiced by other than the described embodiments, which are presented for purposes of illustration rather than of limitation, and that the present invention is limited only by the claims that follow.

What is claimed is:

1. A machine learning method for managing a transactional web that is too complex to be managed by a human, the method comprising, using one or more machine learning techniques:
   determining an alert trigger for a target transaction within the transactional web, wherein criteria defining the alert trigger comprise a target mobile device and a target geographical region;
   in response to detecting the alert trigger, determining an actionable response for the target transaction that comprises requiring approval of the target transaction from a desktop device;
   formulating a notification that includes the alert trigger and the actionable response;
   based on the criteria defining the alert trigger, determining a first strategic communication channel for transmitting the notification;
   providing a system user with the notification using the first strategic communication channel;
   applying the actionable response to the target transaction;
   formulating a confirmatory alert after applying the actionable response;
   based on the actionable response, determining a second strategic communication channel for transmitting the confirmatory alert;
   providing the confirmatory alert to the system user using the second strategic communication channel;
   using the one or more machine learning techniques:
      determining a plurality of alert triggers;
      formulating a corresponding actionable response for each of the plurality of alert triggers;
      when any of the plurality of alert triggers are detected, using the first strategic communication channel, providing the system user notification that includes the detected alert trigger and the corresponding actionable response; and
      applying the corresponding actionable response to a transaction within the transactional web and associated with at least one of the plurality of alert triggers;
   wherein each corresponding actionable response requires approval of the transaction associated with at least one of the plurality of alert triggers from the desktop device.

2. The method of claim 1 wherein detecting the alert trigger indicates unauthorized approval for the target transaction.

3. The method of claim 1, further comprising, using the one or more machine learning techniques:
   determining a plurality of alert triggers that, if detected, would trigger the actionable response;
   when any of the plurality of alert triggers are detected:
      using the first strategic communication channel, providing the system user notification that includes the detected alert trigger; and
      applying the actionable response to a transaction within the transactional web and associated with the detected alert trigger.

4. The method of claim 2 further comprising using the one or more machine learning techniques:
   detecting multiple transactions within the transactional web that each share attributes in common with the target transaction; and
   detecting the plurality of alert triggers based on the common attributes.

5. The method of claim 1 further comprising using the one or more machine learning techniques:
   detecting multiple transactions within the transactional web that each share attributes in common with the target transaction;
   formulating alert triggers for each of the multiple transactions; and
   formulating corresponding actionable response for each of the multiple transactions.

6. The method of claim 1 wherein the system user is a first system user, the method further comprising using the one or more machine learning techniques:
   detecting the alert trigger by detecting action or inaction by a second system user; and
   formulating additional alert triggers for transactions within the transactional web associated with the second system user.

7. The method of claim 1 further comprising using the one or more machine learning techniques:
   applying the machine learning technique to detect multiple transactions within the transactional web that require input from the system user; and
   formulating the confirmatory alert such that the system user is informed after successful execution of any of the multiple transactions.

8. The method of claim 1 further comprising using the one or more machine learning techniques, adjusting the alert trigger based on actions taken by the system user after defining the criteria defining the alert trigger.

9. The method of claim 1 further comprising using the one or more machine learning techniques, adjusting the actionable response after deploying the actionable response.

10. An artificial intelligence ("AI") notification platform for managing a transactional web that is too complex to be managed by a human, the AI notification platform comprising:
   a secure treasury application running on a mobile device;
   a secure transactional server accessible from the mobile device running the secure treasury application; and
   a remote computer system running an artificial intelligence ("AI") engine;
   wherein:
   the secure treasury application:
      provides an interface for a user of the mobile device to request notification when a first alert trigger is detected in connection with a target transaction included in the transaction web and executable by the secure transaction server; and
      in response to receiving the request for the notification, initiates a tracing of the target transaction within the transactional web; and
   the AI engine:
      detects a second alert trigger on the secure transactional server in connection with the target transaction;
      formulates a push notification for the mobile device, the push notification comprising a first actionable response associated with the second alert trigger that can be deployed from within the push notification;
      formulates a second actionable response, wherein the second actionable response requires approval of the target transaction from a desktop device;
      transmits the push notification to the mobile device;
      pauses the target transaction on the secure transactional server pending deployment of the first actionable response associated with the second alert trigger;
      in response to detecting deployment of the first actionable response associated with the second alert trigger, applies the first actionable response to the target transaction;
      in response to failing to detect deployment of the first actionable response associated with the second alert trigger within a threshold time, applies the second actionable response to the target transaction
   wherein the AI engine formulates a series of push notifications based on the criteria defining the first alert trigger; and
   wherein the series of push notifications are configured to be transmitted when the AI engine detects an alert trigger associated with any transaction included in the transactional web and associated with the user on the secure transactional server.

11. The apparatus of claim 10, the AI engine formulates a series of push notifications for the target transaction based on criteria defining the first alert trigger.

12. The apparatus of claim 10, wherein the AI engine formulates the actionable response based on activity of the user within the secure treasury application.

13. The apparatus of claim 10, wherein the AI engine formulates the actionable response based on the criteria defining the detected second alert trigger.

14. The apparatus of claim 10, wherein the AI engine formulates the actionable response in real-time each time the second alert trigger is detected on the secure transactional server.

* * * * *